Jan. 21, 1958  G. H. FUEHRER  2,820,611
DRILLING APPARATUS
Filed March 30, 1953  5 Sheets-Sheet 2
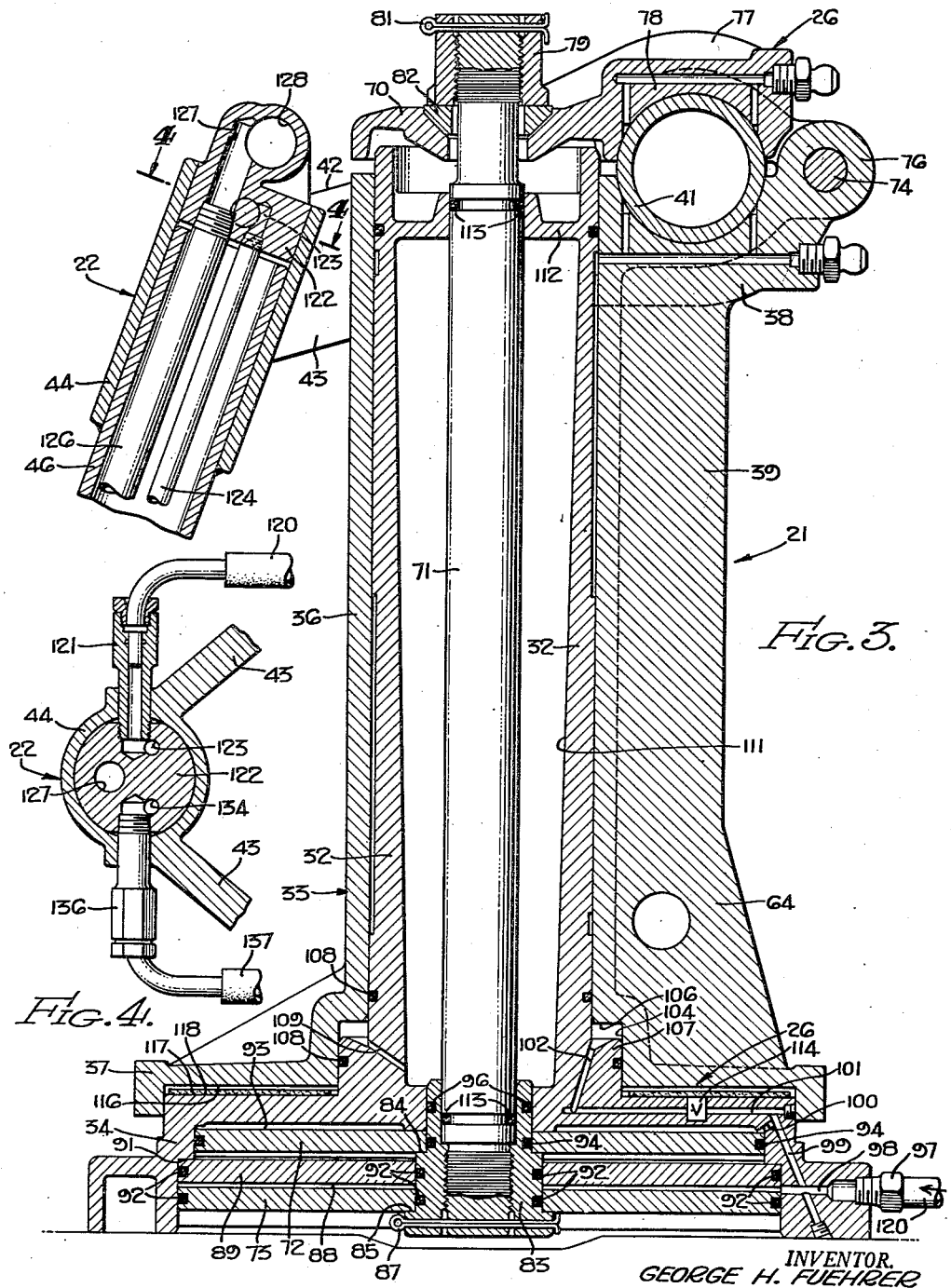
INVENTOR.
GEORGE H. FUEHRER
BY
ATTORNEY Jan. 21, 1958

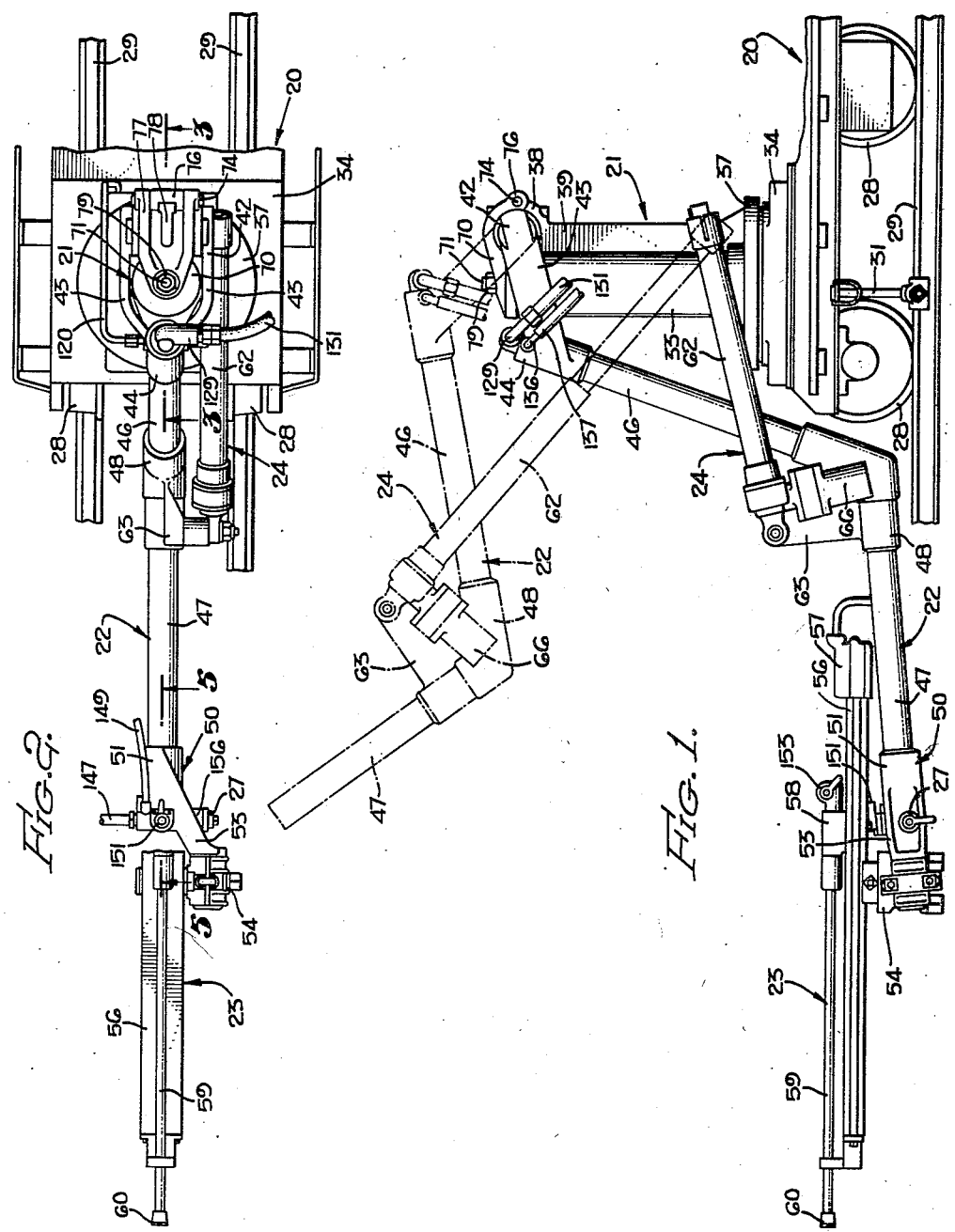

G. H. FUEHRER 2,820,611

DRILLING APPARATUS

Filed March 30, 1953

INVENTOR.
GEORGE H. FUEHRER
BY
ATTORNEY

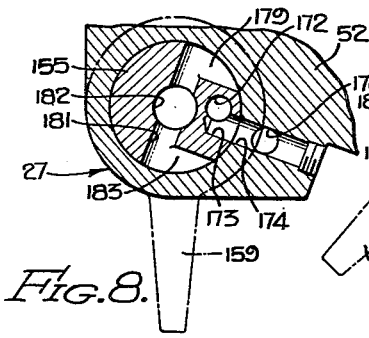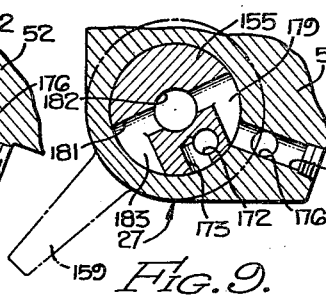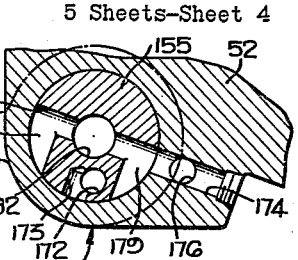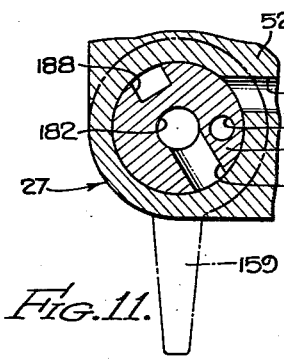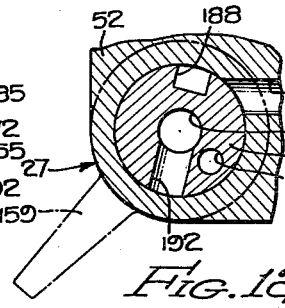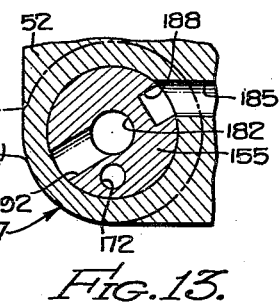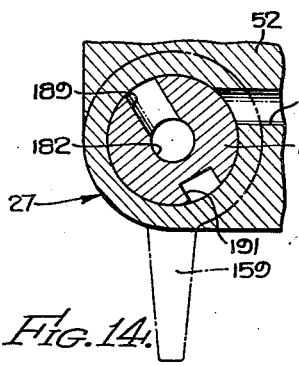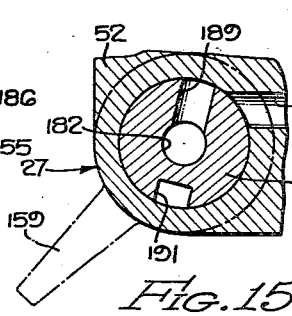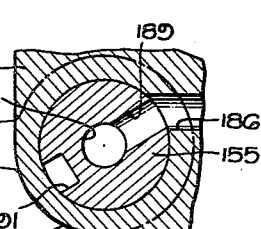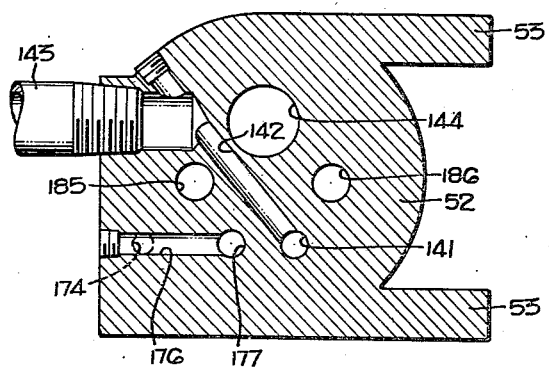

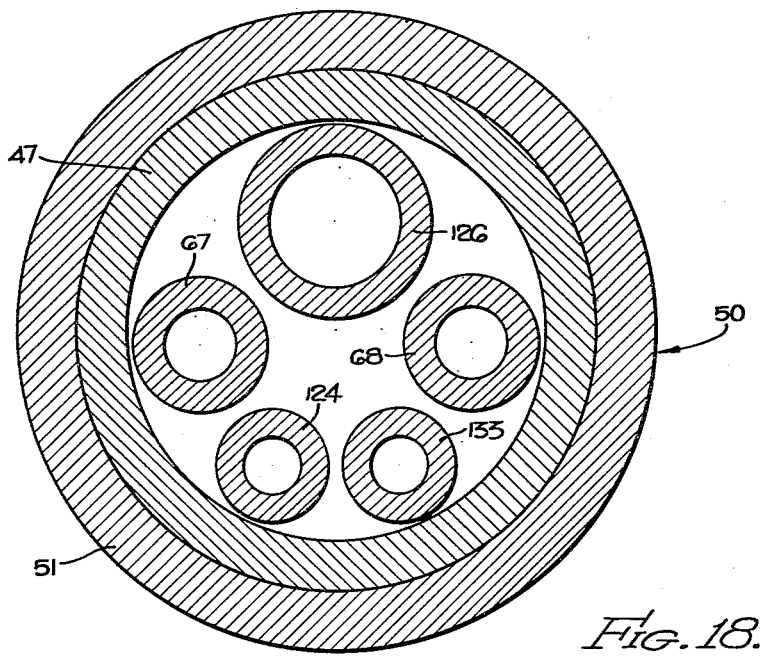
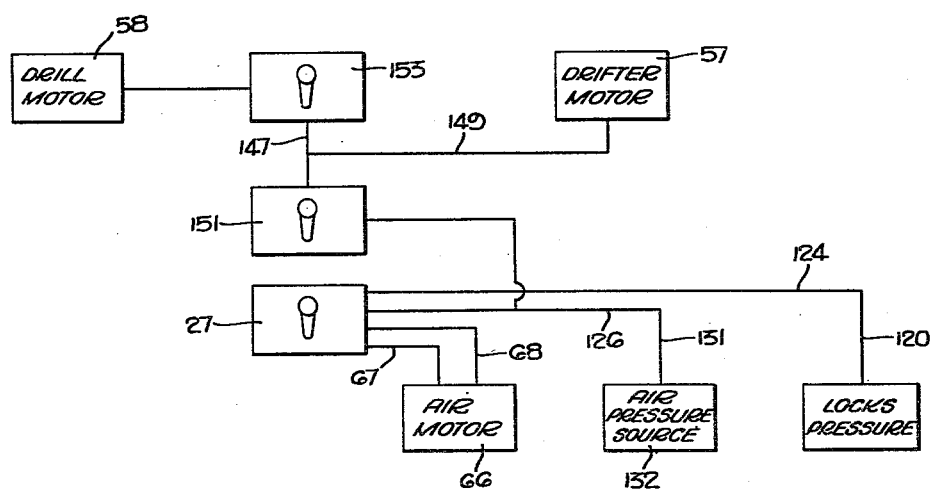

United States Patent Office 2,820,611
Patented Jan. 21, 1958

2,820,611

DRILLING APPARATUS

George H. Fuehrer, Downey, Calif., assignor to Thor Power Tool Company, a corporation of Delaware Application March 30, 1953, Serial No. 345,340

16 Claims. (Cl. 255—51)

The present invention relates to portable drilling apparatus, and particularly to a boom-type drill support the boom of which is capable of being vertically and horizontally pivoted to a variety of drill-locating positions and locked in such positions by a control located adjacent the drill itself.

In mining and tunneling operations it is necessary to provide means for maintaining the heavy drill mechanism in adjusted positions adjacent the tunnel face being operated upon. This may be accomplished by providing a manually movable frame structure, but the great amount of time lost in setting up and moving such a structure has resulted in recent years in the use of an easily movable apparatus known as a "boom jumbo" or a "drill jumbo." Such an apparatus usually comprises a truck movable on a trackway and incorporating a forwardly extending arm or boom adapted at its forward end to support the drilling mechanism, which is conventionally of the drifter type incorporating means to feed a drill bit into the rock. In order to provide for the ready positioning of the drill at any part of the surface to be drilled, the boom is normally pivotable about both a horizontal axis and a vertical axis, and the drill mounted at the boom end is likewise pivotable about both horizontal and vertical axes. Since it is necessary for efficiency that the operator of the apparatus stand in a position closely adjacent the drill itself, instead of adjacent the truck upon which the boom is mounted, it is highly desirable that all control devices be located at the drill instead of on the truck. It is also important to the proper operation of the apparatus that the boom be rigidly locked or braked in each desired position, but that upon releasing of the brakes the pivoting of the boom about its vertical axis be substantially frictionless since this pivotal movement is performed manually.

With an appreciation of the above problems characterizing the field of boom jumbos, it is an object of the present invention to provide a new and improved means for effecting locking of the boom about both its horizontal and vertical axes by improved control means located at the drill itself to render unnecessary any movement by the operator back to the truck on which the boom is mounted.

Another object of the invention is to provide means for simultaneously locking the boom about its horizontal axis and its vertical axis.

A further object is to provide air-bearing means for supporting the boom in a manner permitting its substantially frictionless lateral pivoting to various drill-locating positions.

A further object of the invention is to provide an improved control valve disposed at the forward boom end and constructed to effect raising or lowering of the boom, as well as locking or unlocking of the boom about both of its axes.

These and other more specific objects and advantages of the invention will appear upon a reading of the following specification and claims and upon considering in connection therewith the attached drawings to which they relate.

In the drawings:

Figure 1 is a side elevational view showing the boom jumbo of the invention in both depressed and elevated conditions;

Figure 2 is a top plan view of the boom jumbo illustrated in Figure 1;

Figure 3 is a vertical sectional view taken at line 3—3 of Figure 2 and showing the means for locking the boom against pivoting about its vertical and horizontal axes;

Figure 4 is a transverse sectional view of the upper end of the boom, taken along line 4—4 of Figure 3;

Figures 8, 9 and 10 are sectional views taken along line 8—8 of Figure 6 and respectively showing the control valve in its locking, exhausting and boom-raising positions;

Figures 11, 12 and 13 are sectional views taken along line 11—11 of Figure 6 and again illustrating the control valve in its locking, exhausting and boom-raising positions;

Figures 14, 15 and 16 are sectional views along line 14—14 of Figure 6 and corresponding to Figures 8–13 to respectively illustrate the boom control valve in the same three positions;

Figure 17 is a transverse section of the boom end, taken at line 17—17 of Figure 5;

Figure 18 is a transverse boom section along line 18—18 of Figure 5 and illustrating the locations of the various air and water conduits; and Figure 19 is a schematic diagram of the air system of the invention.

Figure 5:
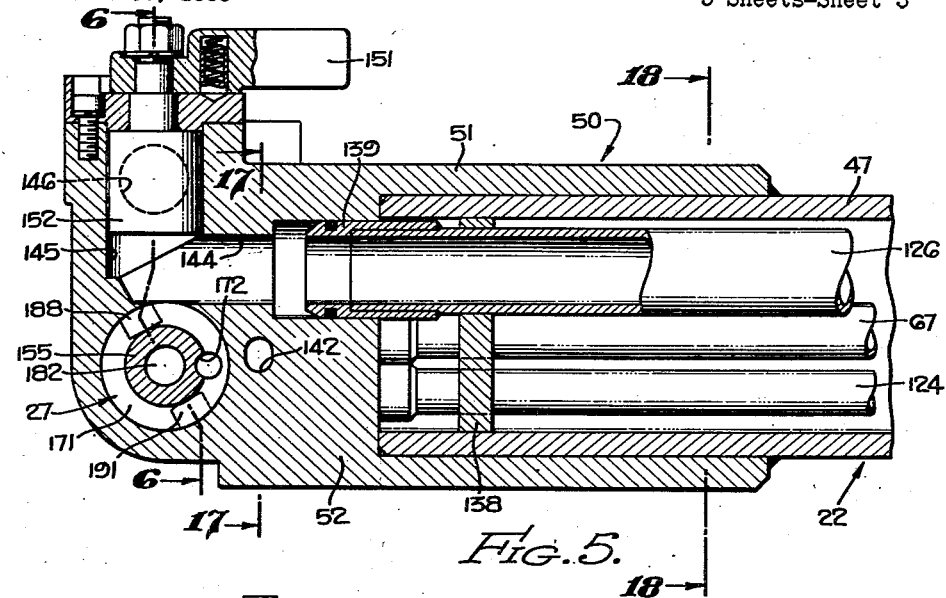
Figure 5 is a longitudinal central section of the forward boom end, taken along line 5—5 of Figure 2.

Referring to the drawings, the boom jumbo may be seen to comprise generally a truck 20, an upright boom-supporting and pivoting structure 21 rigidly mounted at the forward portion of truck 20, a forwardly extending boom 22 pivotally mounted on boom support 21, and a drill mechanism 23 mounted at the forward end of boom 22 for operation on the tunnel face to be drilled. According to the present invention a raising and lowering mechanism 24 is provided to vertically adjust boom 22 and drill mechanism 23; locking means 26 are incorporated in boom support 21 to prevent pivoting of boom 22 about both horizontal and vertical axes, and a master control valve 27 is mounted at the forward boom end to operate both the raising and lowering mechanism 24 and locking means 26.

The truck 20 may be any suitable type, here illustrated as mounted on wheels 28 which ride along a trackway 29 in the floor of the tunnel being constructed. At its rear end the truck 20 usually carries a vertically extending jack mechanism, not shown, adapted to engage the tunnel roof and lock the truck against forward or backward movement during the drilling operation. In addition, the truck is usually provided with suitable track clamps 31 and with brake shoes, not shown, to further insure that the truck will be rigidly maintained in each operating position.

Referring to Figures 1–3, inclusive, the boom-supporting and pivoting structure 21 comprises a tubular pedestal 32 which serves as a bearing for a cooperating column 33, the column being mounted concentrically over the pedestal 32 for adjustable support of boom 22. In addition to the tubular body portion on which column 33 is journalled, pedestal 32 comprises a relatively large hollow base flange 34 which is rigidly anchored to the floor of truck 20 and is preferably annular in shape to provide for mounting of the locking means 26 as will subsequently be described. The column 33 comprises, in addition to its tubular mid-portion 36 which is journalled on pedestal 32, a ribbed base flange 37, a trunnion seat portion 38, and a vertical rib 39 extending between base flange 37 and the trunnion seat. The trunnion seat portion 38 is suitably ground to rotatably support a trunnion tube 41 the opposite ends of which are rigidly welded to a yoke 42 extending forwardly for connection with the inner end of the boom. More specifically, the yoke 42 is constructed with two arms 43 which extend forwardly on opposite sides of the boom support structure 21 and are integral with a downwardly and forwardly inclined sleeve 44 in which the inner end of the boom is welded.

With the above described arrangement the boom 22 and drill mechanism 23 at its forward end may be manually pivoted about a vertical axis comprising pedestal 32, with the column 33, trunnion 41 and yoke 42 being pivoted together with the boom. In addition, the boom 22 and drill mechanism 23 may be pivoted about a horizontal axis comprising trunnion 41 in trunnion seat 38. As will be subsequently described in detail, the locking means 26 are adapted to simultaneously prevent trunnion 41 from rotating in its seat, so that the boom is locked against rotation about a horizontal axis, and to lock column 33 against pivoting on pedestal 32 to prevent lateral adjustment or swinging of the boom and drill.

Proceeding now to a description of boom 22, it comprises two tubular portions 46 and 47 connected by a rigid knee member 48, the angle of the knee member 48 being such that when portion 47 is generally horizontal, as shown in solid lines in Figure 1, portion 46 extends downwardly and forwardly to adjacent the forward end of truck 20. This knee-type boom construction permits the drill mechanism 23 to be maintained in a forwardly extending horizontal position regardless of the vertically or horizontally pivoted boom position, as is described and claimed in my co-pending application, Serial No. 336,105, filed February 10, 1953, and entitled Drilling Apparatus.

At the forward end of the boom is mounted a valve housing and drill support member 50 having a tubular inner portion 51 welded over the outer end of tubular boom portion 47 as shown in Figure 5. Tubular portion 51 is integral with a solid end portion 52 and with a laterally and forwardly extending ribbed bracket 53 (Figure 2). The end bracket 53 is provided at its forward end with a suitable trunnion to support a universal tool or drill mounting 54, the latter being constructed to permit pivoting of the drill 23, relative to boom 22, about both horizontal and vertical axes.

The drill mechanism 23 may be of any suitable type, and preferably comprises a longitudinally extending drifter guide shell 56 mounted at its center on drill mounting 54. Guide shell 56 has a suitable air motor 57 mounted at its inner end and adapted to feed a rock drill motor 58 in forward and reverse directions along the guide shell. Drill motor 58 operates a drill steel 59 having a drill bit 60 at its forward end for operation on the rock to be bored. The drifter motor 57 thus effects the feeding of the drill bit into the rock, while the drill motor 58 provides the rotating and reciprocating drill action effecting the wearing or cutting of the rock.

The boom and drill raising and lowering mechanism 24 comprises an actuating arm 62 which is pivotally connected at its forward end to an upwardly extending rigid bracket 63 on knee member 48, and at its rear end to an apertured portion 64 (Figure 3) of column rib 39. The actuating arm 62 may be of any suitable type but preferably comprises two concentric tubular members adapted to be telescoped inwardly and outwardly upon relative rotation of an interiorly positioned nut and feed screw, both unshown. The complete telescoped position of the tubular members is illustrated in solid lines in Figure 1 and corresponds to the extreme depressed position of boom 22. On the other hand, the extreme elevated boom position is shown in dash lines in Figure 1, and is effected by outward telescoping or extending of the two tubular members as the result of relative rotation of the nut and feed screw.

In order to operate the nut and feed screw for pivoting of boom 22 between its extreme positions shown in Figure 1, a reversible air motor 66 is mounted in depending relation at the forward end of actuating arm 62. Motor 66 is preferably of a reversible rotary sliding vane type and is provided with two ports, not shown, adapted alternately to admit and exhaust air for operation of the motor in forward and reverse directions. The two ports in the motor 66 are respectively associated with suitable rubber hoses, not shown, connected to two pipes or conduits 67 and 68 (Figures 5 and 18) extending longitudinally through boom portion 47. Pipe 67 is related to air motor 66 in such a way that when air is conducted through it from control valve 27 to the air motor, the motor will operate in a direction to raise the boom 22. Pipe 67 is therefore termed the "raise" pipe. Conversely, pipe 68 is termed the "lower" pipe since when it conducts air from the control valve 27 to motor 66 the motor will operate in the reverse direction and effect boom lowering.

Referring again to Figure 3 for a detailed description of the means 26 for locking boom 22 against rotation about its horizontal and vertical axes, between vertical pivoting operations effected by motor 66 and lateral pivoting operations which are manually effected by the operator at the forward boom end, there is shown a hinged cap 70 adapted to be actuated through a vertical connecting rod 71 by a pair of piston discs 72 and 73. Cap 70 is suitably shaped to seat over the upper surface of boom trunnion 41 and also over the upper end of pedestal 32, there being sufficient spacing between the cap, pedestal and column to permit tightening of the cap on trunnion 41 upon downward shifting of connecting rod 71. The hinged connection for cap 70 comprises a horizontal rod 74 journalled in a suitable bearing 76 which is formed integral with the mid-portion of trunnion seat 38. The ends of rod 74 protrude from bearing 76 and through relatively strong rib portions 77 of cap 70, the rib portions extending between the yoke arms for termination at the upper end of connecting rod 71, as best shown in Figure 2. In addition to rib portions 77, the hinged cap is formed with a central lubricating dome 78 containing suitable lubricating passages which cooperate with similar passages in trunnion seat 38 to facilitate boom pivoting between locking operations.

Connecting rod 71 extends axially of the full length of pedestal 32 and through an aperture in cap 70 for threaded connection with a nut 79. This connection preferably includes a cotter pin 81 locking the nut 79 against rotation relative to the connecting rod, and a wedge ring 82 seated between the lower nut surface and a cooperating depression in cap 70. With the above construction, downward shifting of connecting rod 71 through operation of pistons 72 and 73 serves to tighten the hinged cap 70 on trunnion 41 so that the trunnion, yoke 42, and boom 22 are effectively prevented from pivoting about the horizontal axis. The downward shifting of connecting rod 71 also serves to lower the entire column 33 so that its flange 37 comes into braking engagement with the upper portion of pedestal base 34, as will be subsequently described, to prevent rotation of the boom about the vertical axis.

The connection between the pistons and connecting rod 71 comprises an axially disposed plug cylinder 83 slidably mounted in pedestal base 34 and having shoulder portions 84 and 85 which are adapted, respectively, to seat the apertured center portions of piston discs 72 and 73. Cylinder 83 is threaded over the lower end of connecting rod 71, there being a cotter pin 87 to insure that the connection is properly maintained. Downward shifting of disc 73 to depress connecting rod 71, through operation on shoulder 85, is effected by admitting air into a lock pressure chamber 88. The upper wall of this chamber is formed by a disc 89 corresponding to disc 73 and seated at its upper peripheral surface on a shoulder portion 91 of pedestal base 34. The chamber 88 is sealed against leakage by a plurality of O-rings 92 seated in suitable grooves in discs 73 and 89 and in plug cylinder 83. Downward shifting of piston disc 72, which operates on shoulder 84 to lower connecting rod 71, is effected by admitting air into a lock pressure chamber 93 defined by the upper surface of disc 72, the horizontal interior wall of pedestal base 34, and by O-rings 94 at the outer and inner edges of disc 72. In addition to O-rings 94 an O-ring 96 is provided between the upper portion of plug cylinder 83 and the cooperating cylindrical surface of pedestal base 34 to aid in prevention of leakage from chamber 93.

The admission of air into the hollow pedestal base 34 is effected from an air fitting 97 and through a passage 98 in base 34 in the case of chamber 88, and passages 99 and 100 in the pedestal base in the case of chamber 93. The passage 99 communicates through a horizontal passage 101 and vertical passage 102 in the pedestal base with a chamber 104 formed between a shoulder portion 106 of column 33 and a cooperating grooved shoulder 107 formed in the pedestal base. Chamber 104 is sealed by suitable O-rings 108 and communicates through a passage 109 with a large central chamber 111 in pedestal 32. The chamber 111, which may be termed the air reservoir, is sealed against leakage by an internal flange or neck portion 112 at the upper end of pedestal 32, and by O-rings 113 at the upper and lower ends of connecting rod 71. To complete the air conduit and reservoir system in the boom support and pivoting structure 21, a suitable check valve 114 is provided in passage 101 and adapted to prevent air from returning from chamber 104 to air fitting 97.

In the operation of the above-described air conduits, chambers and related elements, the applying of air pressure to fitting 97 causes this pressure to be transmitted to chambers 93, 88, and through check valve 114 to chamber 104. The pressure in chamber 104 will, acting upon the shoulder 106 of column 33, tend to maintain the column and related elements in an upper position. However, this upward force is greatly overbalanced by the force exerted on pistons 72 and 73 in a downward direction, since the combined piston area is much greater than that of the horizontal walls of chamber 104. It follows that the pistons 72 and 73 will pull connecting rod 71, and thus column 33, downwardly until the lower horizontal wall 116 of column 37 engages a brake facing 117 on the upper horizontal surface 118 of pedestal base 34. The surfaces 117 and 118 are thus locked, and rotation of the column 33 about pedestal 32 is effectively prevented as is lateral shifting or swinging of the drill mechanism 23 and boom 22. In addition, the boom 22 is locked against rotation about the horizontal axis through tightening of hinged cap 70 on trunnion 41.

Upon release of the air pressure applied to fitting 97, and consequent venting of the air in chambers 88 and 93, the downward force of tandem pistons 72 and 73 will no longer be present. The air pressure will remain, however, in chamber 104, since check valve 114 prevents any venting. The upward force on shoulder 106 of column 33, exerted by the remaining air pressure in chamber 104, will then be operative to lift the column 33, connecting rod 71, and piston discs 72 and 73 to their upper positions. In addition, the hinged cap 70 is released to permit free movement of trunnion 41 for pivoting of the boom about a horizontal axis, and column surface 116 is disengaged from brake facing 117 to permit free pivoting of the boom about the vertical axis. The pivoting of the boom about its vertical axis is relatively frictionless since the air pressure in chamber 104 provides an air bearing or cushion which supports the weight of the column and boom without in any way increasing the frictional resistance acting to prevent horizontal boom swinging.

The air-bearing support of column 33 is maintained regardless of slight leakage of air from chamber 104 and even during complete disconnection of an air pressure source from fitting 97, as during transporting of truck 20, by the feeding of air from reservoir 111 through passage 109 into chamber 104. Stated otherwise, the air under pressure which was initially passed through passage 109 into reservoir 111 during application of air pressure to fitting 97 serves as a cushion or balance to maintin the air pressure in chamber 104 regardless of slight leakages around the various O-ring seals of the apparatus. Furthermore, the air reservoir 111 operates to prevent compression of the air in chamber 104, so that the upward force on shoulder 106 is constant regardless of the upper or lower positioning of column 33.

The air supply system to fitting 97 for operation of the locking and air bearing means as above described comprises a rubber hose 120 (Figures 1 and 4) leading to a fitting 121 at the inner end of the boom. Referring to Figures 3 and 4, fitting 121 extends through sleeve 44 into a suitably shaped end plug 122 which is welded in sleeve 44 adjacent the upper end of boom portion 46. Fitting 121 communicates through a longitudinal passage 123 in the end plug with a pipe 124, the latter extending for the entire length of boom 22 and to the main control valve 27, as will be described in detail subsequently. Referring particularly to Figures 3 and 18, a relatively large air supply pipe 126, which communicates through control valve 27 with the pipe 124, also extends for the full length of boom 22 and is threaded into plug 122 as in the case of pipe 124. The air supply pipe 126 communicates through longitudinal and transverse passages 127 and 128 in end plug 122 with a fitting 129 (Figures 1 and 2) and an air hose 131 leading to a suitable air pressure source, indicated generally at 132 in Figure 19. The admission and venting of air through fitting 97 at the base of pedestal 32 is thus controlled by valve 27, the latter being shifted by an operator disposed at the forward end of boom 22 as is desired.

The piping system in boom 22 further comprises a water pipe 133 (Figure 18) which extends for the full length of the boom and communicates through a passage 134 in end plug 122, and a fitting 136 with a hose 137 connected to a suitable water source. The various pipes 67, 68, 124, 126 and 133 may be rigidly mounted within boom 22 in any suitable manner, as by spiders such as indicated at 138 in Figure 5, and may extend through the boom knee member 48 by means of any suitable coupling elements, not shown.

Referring particularly to Figures 5, 17 and 18, the five pipes or conduits extending through the tubular horizontal boom portion 47 are circumferentially spaced, as indicated, with the relatively large air supply pipe 126 disposed above "raise" and "lower" pipes 67 and 68, and the lock pressure and water pipes 124 and 133, disposed, respectively, below pipes 67 and 68. All of these pipes are provided with sliding seals, such as the sealing arrangement 139 at the end of air supply pipe 126, which connect the respective pipes with corresponding passages in the solid end portion 52 of the valve housing and drill support element 50.

Referring first to the water supply pipe 133 (Figure 18), it communicates through axial and transverse passages 141 and 142 (Figure 17) with a hose 143 leading to drill motor 58 for supply of water to the drill bit 60. Water may thus be supplied to the drill mechanism 23 under the control of a manually operated valve, not shown.

Figure 6:
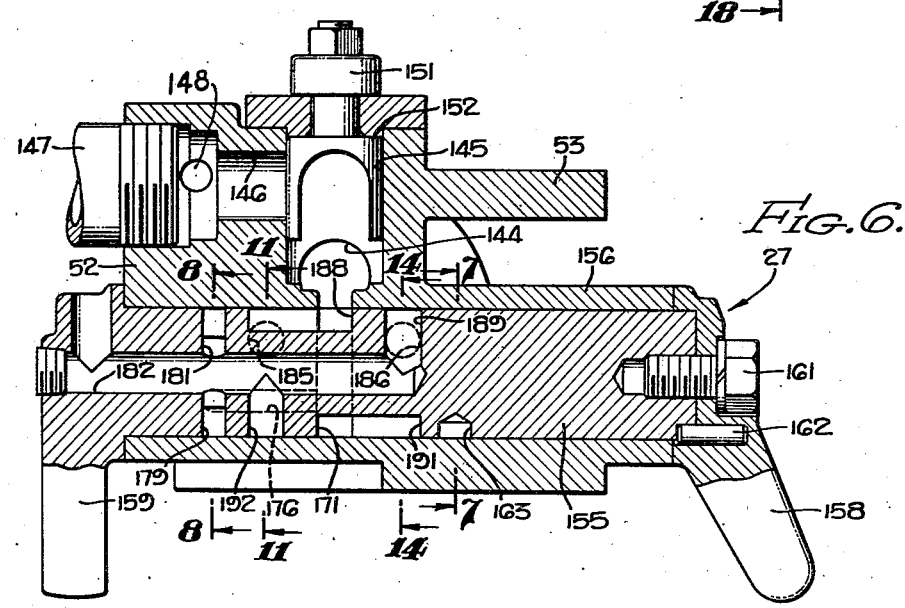
Figure 6 is a transverse section of the forward end of the boom and showing the improved control valve of the invention, taken at line 6—6 of Figure 5 and is viewed in the direction of the arrows.

The main air supply pipe 126 communicates through a large longitudinal passage 144 in solid end portion 52 with vertically extending cylindrical valve chamber 145 shown in Figures 5 and 6. Valve chamber 145, in turn, communicates through a transverse passage 146 and a hose 147 with the drill motor 58. The passage 146 communicates through a relatively small passage 148 with a second and smaller hose 149 (Figure 2) leading to the drifter motor 57. A suitable shutoff valve 151 having a U-shaped portion 152 mounted in valve chamber 145 is operable to selectively open and block the connection between the air inlet passage 144 and passage 146 leading to the drill and drifter motors. In addition, a control valve 153 (Figure 1) is provided in series with shutoff valve 151 to control admission of air to the drill motor 58. The drill motor 58 is thus under control of both the control valve 153 and shutoff valve 151, while the drifter motor 57 is controlled by shutoff valve 151 and by other suitable valves, not shown.

Figure 7:
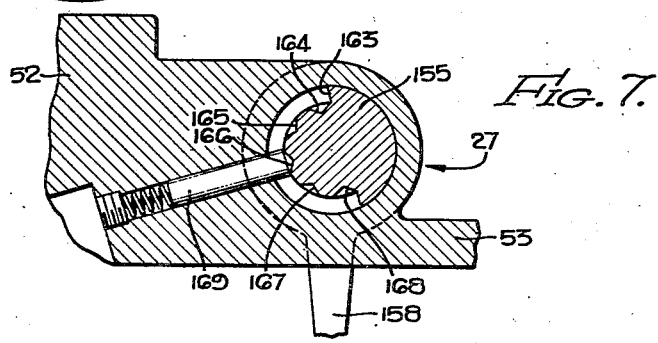
Figure 7 is a sectional view along line 7—7 of Figure 6 and illustrating the detent means for locking the boom control valve in its various positions.

The master control valve 27 will next be described, together with its operation in controlling of the flow of air between air supply pipe 126 and lock pressure pipe 124, and between "raise" and "lower" pipes 67 and 68. The valve 27 comprises an elongated valve cylinder 155 mounted in a corresponding transverse bore which extends through the solid end portion 52 of the valve housing and drill support member 50. The bore for valve cylinder 155 also extends through a laterally extending boss portion 156 of the member 50 as best shown in Figure 6. At opposite ends of valve cylinder 155 are provided a pair of handles 158 and 159, the former of which is mounted adjacent the boss portion 156 by means of a screw 161 and key pin 162, and the latter of which is integral with the valve cylinder. Referring to Figure 7, a semi-circular groove 163 in valve cylinder 155 is provided with notches 164 to 168, inclusive, adapted to selectively receive a spring-pressed detent 169. In this manner, the valve 27 is maintained in any one of its five operating positions at all times except during manual turning of a handle 158 or 159 by an operator disposed on either side of the boom.

The position of control valve 27 to effect admission of air from supply pipe 126 to lock pressure pipe 124 for locking of the boom about both vertical and horizontal axes as discussed in connection with locking means 26 in Figure 3, is that in which the valve handles 158 and 159 are pointing downwardly and detent 169 is registered in notch 166 as illustrated in Figure 7. When the valve is in this position a lock pressure circuit may be traced from air supply pipe 126 and passage 144 to a communicating annular groove 171 in valve cylinder 155 (Figures 5 and 6), then through a longitudinal valve passage 172 (Figures 5 and 8 through 13) to a communicating radial valve passage 173 (Figures 8 through 10). The radial valve passage 173 is at this time registered, as shown in Figure 8, with a generally longitudinal passage 174 in end portion 52. From passage 174 the air flow is through communicating transverse passage 176 (Figures 8, 9, 10 and 17) to a second longitudinal passage 177 in end portion 52. Passage 177 connects to lock pressure pipe 124, these elements being aligned as shown in Figures 17 and 18. When the control valve 27 is in the lock position, all of the other passages in valve cylinder 155 are blocked, as will be subsequently described, so that the air motor 66 is not operating and no venting is taking place.

To cut off the supply of air from pipe 126 to lock pressure pipe 124, and additionally to vent the air from chambers 88 and 93 (Figure 3) for release of the locking action, control valve 27 is rotated in either direction for one position. Thus when either of notches 165 or 167 is registered with detent 169 the air in the lock pressure chambers is vented and the braking action released prior to operation of boom-raising motor 66, which is effected through rotation of valve 27 until either of notches 164 or 168 registers with detent 169. Referring particularly to Figures 5, 6 and 9, the situation is illustrated where the valve cylinder is rotated one step clockwise, that is to say, until notch 165 registers with detent 169. It will be noted from Figure 9 that the radial valve passage 173 leading to air supply pipe 126 is now blocked, and that longitudinal passage 174 now registers with a chamber 179 in valve cylinder 155. The chamber 179 communicates through a diametric valve passage 181 with an axial venting passage 182 which is connected to the atmosphere adjacent valve handle 159, as best shown in Figure 6. The identical venting path is completed when valve cylinder 155 is rotated one step counterclockwise instead of one step clockwise, as shown in Figure 9, the only difference being that the function of chamber 179 is performed by a corresponding chamber 183 at the opposite end of diametric passage 181. Regardless of whether the valve is rotated one step clockwise or counterclockwise, for selective utilization of chambers 179 or 183, the various ports leading to boom raising and lowering motor 66 are blocked and this motor is not operating.

Referring next to Figures 5, 6, 17 and 18, the "raise" pipe 67 communicates with a passage 185 extending through end portion 52 for termination at the bore for valve cylinder 155. Correspondingly, "lower" pipe 68 communicates through a passage 186 with the valve chamber, both of the passages 185 and 186 being axial extensions of the pipes to which they respectively connect. When the control valve is in the clockwise rotated position shown in Figures 13 and 16, with notch 164 in registry with detent 169, a boom-raising circuit may be traced from air supply pipe 126 and passage 144, through annular groove 171 (Figures 5 and 6), to a longitudinal groove 188 in the surface of valve cylinder 155. The groove 188 extends into registry with passage 185 leading to "raise" pipe 67. The resulting transmission of air through pipe 67 to air motor 66 operates, as previously indicated, to elevate boom 22. At the same time that air is admitted to pipe 67 to effect boom elevation, exhaust air is vented from motor 66 through "lower" pipe 68. This venting circuit may be traced from pipe 68 through passage 186 and a radial valve passage 189 leading to an extension of axial valve passage 182 and thus to the atmosphere.

During the described operation of air motor 66 to elevate boom 22, the venting circuit from the lock pressure chambers is maintained due to continued registry of passage 174 with valve chamber 179 as illustrated in Figure 10. It follows that venting of the air in the lock pressure chambers will result even though the control valve is rapidly shifted from its locking to boom elevating position, and that the boom raising motor 66 will never act against the locking action for an appreciable length of time.

In order to operate the motor 66 in the reverse direction and thus lower the boom, control valve is rotated 180 degrees from the position shown in Figures 10, 13 and 16. Air then flows to motor 66 from air supply pipe 126 through a circuit including passage 144, annular groove 171, a longitudinal valve groove 191 diametrically opposite groove 188 but axially displaced therefrom, passage 186, and "lower" pipe 68. Similarly, an exhaust path is completed from "raise" pipe 67 and passage 185, through a radial passage 192, venting passage 182, and to the atmosphere. It will be noted that when the control valve 27 is in this position effecting lowering of the boom, notch 168 is registered with detent 169, and valve chamber 183 (Figure 10) is registered with passage 174, so that a venting path is completed from the lock pressure chambers as in the boom raising situation.

In the operation of the boom jumbo, assume that the boom is in the depressed position shown in solid lines in Figure 1, and that the boom has been swung about its vertical axis until drill bit 60 is at the desired lateral position adjacent a portion of the tunnel face being operated on. Control valve 27 is then shifted to its boom locking position, with the handles 159 and 158 pointed downwardly as shown in Figures 6, 7, 8, 11 and 14. A locking circuit is then completed from air pressure source 132 through hose 131, pipe 126 within boom 22, the previously described passages in control valve 27, lock pressure pipe 124, fitting 121, air hose 120, fitting 97 in pedestal base 34, and through passages 98, 99 and 100 to lock pressure chambers 88 and 93. The piston discs 72 and 73 are thus shifted downwardly to lower connecting rod 71 and tighten the hinged cap 70 against the upper surface of boom trunnion 41 so that the boom is locked about its horizontal axis. The lowering of the piston discs 72 and 73, and connecting rod 71, further operates to lower the entire column 33 until wall 116 of column base 37 locks against brake facing 117 to prevent rotation of the boom about its vertical axis. As the air pressure is thus supplied to effect locking of the boom, the air reservoir 111 within pedestal 32 is filled through a path including check valve 114, passages 101 and 102, chamber 104 and passage 109.

Upon completion of the drilling operation at a particular portion of the tunnel face control valve 27 is rotated one step in either direction, for example to the position shown in Figures 9, 12 and 15, to block the supply of air from the pipe 126 to lock pressure pipe 124. Pipe 124 then becomes a venting conduit to vent the air from lock pressure chambers 88 and 93 through a circuit the reverse of that above described, and out axial passage 182 in valve 27 to the atmosphere. Although the air is thus vented from lock pressure chambers 88 and 93, check valve 114 (Figure 3) prevents venting of air from chamber 104 and reservoir 111. The air pressure in chamber 104 is then operative to elevate the entire column 33 and boom 22 to provide an air cushion or bearing. The braking action being released, the drill may be laterally shifted, in a substantially frictionless movement, to any desired position by the operator located at its forward end.

To raise or lower the boom the operator shifts control valve 27 to one of its extreme positions, for example the one shown in Figures 10, 13 and 16. A circuit is then completed through the previously described valve passages from air supply pipe 126 to "raise" pipe 67. This operates motor 66 in a forward direction, for example until the actuating arm 62 is extended to pivot boom 22 upwardly to the extreme position shown in dashed lines in Figure 1. During the boom raising operation the exhaust air from motor 66 is vented through "lower" pipe 68 and out axial passage 182 in the control valve. Furthermore, the venting of the air from lock pressure chambers 88 and 93 is continued as previously described. To lower the boom 22, for example after appropriate boom locking and drilling operations, the control valve 27 is rotated to the position of 180 degrees removed from that shown in Figures 10, 13 and 16. The direction of air flow in pipes 67 and 68, and thus the direction of rotation of motor 66, is then reversed, with the pipe 68 conducting air to the motor and pipe 67 serving to exhaust air through valve passage 182 to the atmosphere.

It is pointed out that the boom 22 and column 33 may be regarded as a "boom assembly," which is supported on the pedestal 32 for longitudinal and rotational movement.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a rock drilling apparatus for use in mining and tunneling operations, a movable support, a pedestal having a hollow base immovably anchored on said support, said pedestal base having a relatively large upper surface, a column mounted on said pedestal for longitudinal and rotational movement relative thereto, said column having a base flange the lower surface of which is adapted to lock with said upper pedestal base surface, a drill supporting boom mounted at the upper end of said column and rotatable therewith to position laterally a rock drill relative to the tunnel face to be drilled, fluid operated means disposed in said pedestal base and operably connected to said column to effect downward movement thereof, and means to admit fluid pressure into said pedestal base to shift said fluid operated means, column and boom downwardly until said pedestal base surface and said lower surface of the base flange of the column are in locking engagement preventing rotation of said column and boom.

2. The rock drilling apparatus as claimed in claim 1, wherein air bearing means are provided to normally maintain said column and boom in an elevated freely rotatable condition, said air bearing means including a chamber defined in part by said pedestal and in part by said column, and wherein means are provided to introduce into and maintain in said chamber air under sufficient pressure to maintain said column and boom in said elevated rotatable condition except during said fluid pressure shifting of said fluid operated means.

3. In a rock drilling apparatus for use in mining and tunneling operations, a truck, an upwardly extending pedestal anchored on said truck, a column mounted on said pedestal for rotation about a vertical axis and for longitudinal shifting on said pedestal, lock surface means associating said column and pedestal to effect locking of said column against rotation about said vertical axis upon longitudinal shifting of said column to a predetermined position, a boom, a pivot member rigidly associated with said boom and journalled in the upper portion of said column for rotation about a horizontal axis, means to rotate said boom and pivot member about said horizontal axis, a drill mounted at the outer end of said boom for lateral adjustment through rotation of said boom, pivot member and column about said vertical axis and for vertical adjustment through said rotation of said boom and pivot member about said horizontal axis, a piston mounted in said pedestal, and means operably connecting said piston with said column and pivot member to shift said column to said predetermined position and to effect simultaneous locking of said boom against rotation about said horizontal and vertical axes upon fluid shifting of said piston to a locking position.

4. In a rock drilling apparatus for use in mining and tunneling operations, a truck, an upwardly extending pedestal anchored on said truck, a column mounted on said pedestal for rotation about a vertical axis and for longitudinal shifting on said pedestal, lock surface means associating said column and pedestal to effect locking of said column against rotation about said vertical axis upon longitudinal shifting of said column to a predetermined position, a boom, a pivot member rigidly associated with said boom and seated on the upper portion of said column for rotation about a horizontal axis, a cap member seated over said pivot member, a drill mounted at the outer end of said boom for lateral adjustment through rotation of said boom and column about said vertical axis and for vertical adjustment through rotation of said boom and pivot member about said horizontal axis, a piston mounted in said pedestal, and means connecting said piston and cap for tightening of said cap into locking engagement with said pivot member upon shifting of said piston to a locking position, said piston also serving when in said locking position to hold said column in said predetermined position and thus prevent rotation of said column relative to said pedestal.

5. A rock drilling apparatus comprising a truck, an upwardly extending pedestal anchored on said truck, said pedestal having an extended flange the upper surface of which has substantial area, a column journalled over said pedestal above said flange for shifting longitudinally of said pedestal and for rotation about a vertical axis, said column having a base flange corresponding to said pedestal flange and shaped to lock therewith, a drill supporting boom having a pivot portion seated at the upper end of said column for rotation of said boom about a horizontal axis, a cap member pivotally connected to the upper end of said column and seated over said boom pivot portion, a piston mounted interiorly of said pedestal, a connecting rod extending from said piston for connection to said cap member at the opposite side of said boom pivot portion from the pivotal connection between said cap member and column, and fluid pressure means to shift said piston downwardly to a locking position; said piston and connecting rod then serving to tighten said cap member into locking contact with said boom pivot portion and prevent rotation of said boom about said horizontal axis, and to shift said column and boom downwardly until said pedestal and column flanges are in locking engagement and boom rotation about said vertical axis prevented.

6. The invention as claimed in claim 5, wherein air bearing means are provided to normally support said column and boom in a freely rotatable elevated condition, said air bearing means including means to define a collapsible chamber the opposed walls of which are formed by surfaces of said pedestal and column, and wherein means are provided to introduce into and maintain in said chamber air under pressure sufficient to support said column and boom in elevated freely rotatable condition except during maintenance of said piston in said locking position by said fluid pressure means.

7. In a drilling apparatus for use in mining and tunneling operations, a movable support, a pedestal anchored on said support, a column rotatably supported by said pedestal for rotation about a vertical axis passing therethrough, a boom pivotally connected to the upper portion of said column for rotation about a horizontal axis, a drill mounted at the outer end of said boom, said drill being laterally movable through pivoting of said boom about said vertical axis and vertically movable through pivoting of said boom about said horizontal axis, a chamber formed between cooperating generally horizontal portions of said pedestal and column, and means to maintain sufficient fluid pressure in said chamber to provide fluid support for said column and boom, said fluid support arrangement permitting substantially frictionless pivoting of said boom about said vertical axis to facilitate lateral adjustment of said drill.

8. In a rock drilling apparatus for use in mining and tunneling operations, a truck, an upwardly extending pedestal mounted on said truck, a column journalled on said pedestal for rotation about a vertical axis, a drill support boom mounted on said column, an air pressure chamber the upper and lower walls of which are formed, respectively, by said column and pedestal, means to define a relatively large air pressure reservoir interiorly of said pedestal, said reservoir communicating with said air pressure chamber, and means to inject air under pressure into said reservoir and air chamber, said air injection being under the control of an operator and being intermittent during normal operation of the apparatus, whereby the air in said chamber serves to maintain said column and boom in an elevated position for substantially frictionless pivoting about said vertical axis, and the air in said reservoir maintains the air pressure in said chamber substantially constant during periods when no air is being injected.

9. In a rock drilling apparatus, a truck, an upwardly extending hollow pedestal mounted on said truck, a column mounted on said pedestal for longitudinal movement relative thereto and for rotation about a vertical axis, a drill supporting boom mounted on said column for rotation therewith, means to define an air chamber the upper wall of which comprises a portion of said column and the lower wall of which comprises a portion of said pedestal, a piston mounted interiorly of said pedestal and operably connected to said column, the working surface of said piston having a larger area than said upper wall of said air chamber, and a single source of air pressure connected to said air chamber and to said pedestal above said piston, said arrangement operating to shift said piston, column and boom downwardly against the air pressure bias exerted against said portion of said column.

10. In a drilling apparatus, a movable support, a vertically disposed pedestal having a fluid-tight hollow base anchored on said support, a column journalled on said pedestal for longitudinal shifting relative thereto and for rotation about a vertical axis, said column and pedestal having relatively small cooperating shoulder portions forming, respectively, the upper and lower walls of an air chamber, said column and pedestal also having cooperating lock surfaces adapted to come into locking engagement with each other upon downward shifting of said column, a drill supporting boom mounted on said column, a relatively large piston mounted in said hollow pedestal base and operably associated with said column to shift it downwardly into locking engagement with said pedestal, conduit means to admit air under pressure into said chamber and into said pedestal base above said piston, and check valve means to prevent the escape of air from said chamber only, whereby said piston, column and boom are maintained in a depressed locking position during application of air pressure to said conduit means, and are shifted upwardly by the residual air pressure in said chamber upon connection of said conduit means to a vent.

11. The invention as claimed in claim 10, wherein the interior of said pedestal above said base is sealed to form an air reservoir, and said reservoir is connected to said air chamber to supply air thereto after discontinuance of the air pressure supply through said conduit means.

12. A rock drilling apparatus, comprising a truck, a vertically disposed tubular pedestal having a hollow base flange anchored on said truck, said pedestal having internal wall means forming a piston chamber in said base and an air reservoir chamber above said base, a tubular column journalled over said pedestal and having a base flange shaped to lock with said base flange of said pedestal for prevention of column rotation, said pedestal and column being shaped with cooperating shoulders forming, respectively, the lower and upper walls of an air bearing chamber, port means to connect said air bearing and air reservoir chambers, a drill supporting boom, a horizontal pivot member seated on the upper end of said column and rigidly connected to said boom for rotation thereof about a horizontal axis, a hinged cap seated over said pivot member, a piston mounted in said piston chamber and connected to said cap, said piston being of large area compared to the upper wall of said air bearing chamber, an air conduit connected to said piston chamber above said piston and to said air bearing and reservoir chambers, and check valve means to prevent the escape of air from said air reservoir and air bearing chambers upon venting of the air in said piston chamber.

13. In a drilling apparatus, a truck, a pedestal anchored on said truck, a column journalled on said pedestal for rotation about a vertical axis, a boom mounted on said column and rotatable about a horizontal axis, means to lock said boom against rotation about said horizontal axis, a drill mounted at the outer end of said boom and laterally adjustable upon rotation of said boom and column about said vertical axis, means to define a lock pressure chamber in said pedestal, fluid operated means associated with said lock pressure chamber to lock said column against rotation about said vertical axis upon admission of fluid to said lock pressure chamber and to release said locking action upon venting of fluid therefrom, a control valve mounted at said outer end of said boom, first conduit means in said boom to conduct fluid to said control valve, supply means to conduct fluid to said first conduit means, second conduit means to connect said control valve and said lock pressure chamber, and passage means in said control valve to alternately connect said first conduit means to said second conduit means, and said second conduit means to a vent.

14. In a rock drilling apparatus, a vehicle serving as a movable base member, a boom support member mounted on said base member, a boom assembly having one end portion mounted on said boom support member for upward and downward movement relative thereto and for rotation about a generally vertical axis, the other end portion of said boom assembly being adapted to support a rock drill, said boom support member including means cooperating therewith to define a fluid chamber an upper wall portion of which comprises a part of said one portion of said boom assembly, and means for supplying pressurized fluid to said chamber and to maintain sufficient pressure on said fluid to support said boom assembly while permitting the boom assembly to rotate about said vertical axis with a minimum of friction.

15. The invention as claimed in claim 14, in which said fluid is air, and a lower wall portion of said fluid chamber comprises a part of said boom support member.

16. The invention as claimed in claim 15, in which cooperating upper and lower lock surfaces are formed, respectively, on said one end portion of said boom assembly and on said boom support member, and in which fluid pressure means are provided to shift said one boom end portion downwardly until said lock surfaces are in locking engagement with each other, said last-named means being sufficiently strong to overcome the supporting action of the fluid in said fluid chamber.

References Cited in the file of this patent
UNITED STATES PATENTS

| | | |
|---|---|---|
| 1,840,784 | McMillan | Jan. 12, 1932 |
| 1,842,026 | Hulshizer | Jan. 19, 1932 |
| 2,500,931 | Curtis | Mar. 21, 1950 |
| 2,500,932 | Curtis et al. | Mar. 21, 1950 |
| 2,616,667 | Dick | Nov. 4, 1952 |
| 2,777,671 | Fuehrer | Jan. 15, 1957 |